3,311,651
PROCESS FOR THE PRODUCTION OF
HYDROLYZABLE AMINOMETHYLSILI-
CON COMPOUNDS
Hans Niederprüm, Monheim, Rhineland, and Walter
Simmler, Cologne-Mulheim, Germany, assignors to
Farbenfabriken Bayer Aktiengesellschaft, Leverkusen,
Germany, a corporation of Germany
No Drawing. Filed July 26, 1963, Ser. No. 297,984
Claims priority, application Germany, Aug. 2, 1962,
F 27,503
9 Claims. (Cl. 260—448.2)

The invention is concerned with the production of silicon-organic compounds which contain, as the characteristic structural element, the grouping:

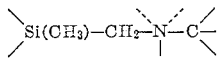

whereby an O— or N-bound group which can be split off by hydrolysis is attached directly to the silicon atom of this group or is attached to another silicon atom connected thereto via an Si—O—Si bridge.

According to the invention, such compounds are produced in that a bromomethyl silane derivative of the general formula:

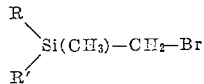

wherein R signifies a lower alkoxy radical or chlorine, and R' denotes the methyl radical or the same as R, is either partially hydrolyzed together with an alkoxy-silane or ammonolyzed or aminolyzed by itself or together with another organo-chlorosilane and reacted in a simultaneous or subsequent reaction with ammonia or a primary or secondary amino compound, optionally in the presence of a hydrogen bromide-binding tertiary amine.

Examples of the alkoxy-silanes to be used for the partial co-hydrolysis are tetraethoxy-silane, methyl-triethoxy-silane or dimethyl-diethoxy-silane. Examples of the amino compounds to be reacted with the silicon-bound bromomethyl group are methylamine, propylamine, allylamine, diethylamine, β-hydroxyethylamine, N-(β-hydroxyethyl) - methylamine, ethylene - diamine, N,N' - di-methyl-ethylene-diamine, N-(β-hydroxyethyl) - ethylene-diamine and di-(β-aminoethyl)-amine.

The amination of the bromomethyl group in the alkoxy derivatives proceeds surprisingly smoothly, in some cases even at room temperature. The resultant ammonium bromide or amine hydrobromide does not form a solvate, even in the case of the trialkoxy-siloxyl derivatives, in spite of the accumulation of alkoxy groups, but precipitates as crystals. The aminated alkoxy-siloxanes can be dissolved in aqueous alcohol to give comparatively stable solutions of high concentration, if the water content corresponds to the molecular ratio 1H₂O:2RO. However, even in the case of 2H₂O:2RO, insoluble hydrolysis and condensation products are not formed immediately, but gradual gelling takes place instead.

The amination of the Si—Cl bond in the methyl-bromomethyl-chlorosilanes proceeds unexpectedly insofar as, under certain reaction conditions, this step can be kept separate from the following step of the amination of the bromomethyl group; the formation of undefined polymers is thereby avoided.

If a bromomethyl-dimethyl-chloro- or alkoxy-silane is reacted with amines which bear, in the 2-position to the amino group, functional groups which are able to react with the fourth substituents on the Si atom of the silane, then six-membered heterocycles are formed. Thus, there can be produced: from bromomethyl-dimethyl-chlorosilane and N,N'-dimethyl-ethylene-diamine, 1,2,2,4-tetramethyl-2-sila-piperazine, from bromomethyl-dimethyl-chlorosilane and ethanolamine, 2,2-dimethyl-2-sila-morpholine and from bromomethyl-dimethyl-ethoxy-silane, 2,2,4-trimethyl-2-sila-morpholine.

Six-membered heterocycles with two Si atoms in the ring result by the action of ammonia or primary amines on bromomethyl-dimethyl-chlorosilane via the stage of the corresponding sym.-di-(bromomethyl)-tetramethyl-disilazane. Hereby result 2,2,6,6-tetramethyl-2,6-disila-piperazines which may be N,N'-substituted.

The types with —N—Si—CH₂—N— groupings are distinguished in that they can have C—N substituents which, by other methods, are difficult to obtain or cannot be obtained at all, and that, as a result of the Si—N bond, react more quickly with water or hydroxyl groups than is the case with the alkoxy derivatives.

Because of their differentiated di- or poly-functionality, i.e. the hydrolytic function with self condensation, as well as the function with Si—O— or Si—N— which react readily with HOC compounds, and the C-bound amine function which is capable of further reaction by known methods, the mostly new compounds to be produced according to the invention are valuable intermediates enabling a precise co-polymerization to be effected with other compounds, and are also suitable impregnating agents, especially for the lasting modification of the surface affinity of technical materials.

The following examples are given for the purpose of illustrating the present invention:

*Example 1*

To a mixture of 375 g. (2 mol) of bromomethyl-dimethyl-chlorosilane and 417 g. (2 mol) of tetraethoxy-silane were added, within 15 minutes, 400 cc. of anhydrous alcohol, subsequently within 2 hours, with good stirring, a mixture of 400 cc. of alcohol and 36 g. (2 mol) of water. After standing for several hours, the mixture was distilled up to a sump temperature of 100° C. The residue (566 g., $n_D^{20}=1.4249$), probably consisting preponderantly of 1,1,1-triethoxy-3,3-dimethyl - 3 - bromo-methyl-disiloxane, was added dropwise within 3 hours to a solution of 413 g. (4 mol) of di-(β-aminoethyl)-amine in 400 cc. of anhydrous toluene. It was further stirred for 3 hours at 80° C. and, after cooling, the precipitated hydrobromide filtered off with suction and washed with toluene. By dissolving the salt in water and titrating, a conversion of 83%, referred to bromide, was ascertained.

The filtrate was evaporated, with evacuation by means of a water jet pump, and blown out with nitrogen at 100° C. and 20 mm. Hg. After renewed filtration, there results a yellowish oil in a yield of 500 g., $n_D^{20}=1.4513$, with the following constitution:

42.6% C; 9.8% H; 15.6% Si and 13.4% N, of which 6.3% primary, 6.3% secondary and 0.8% tertiary N.

For the 1-di-(β-aminoethyl)-amino-methyl-1,1-dimethyl-3,3,3 - triethoxy-disiloxane $C_{13}H_{35}N_3O_4Si_2$ preponderately present 44.15% C; 9.98% H; 15.89% Si and 11.88% N were calculated.

The product is readily soluble in alcohol and is very stable against hydrolysis in this solution. Thus, a 25 percent ethyl alcoholic solution which contains the water necessary for the complete hydrolysis of the ethoxyl groups, shows a remarkable stability; gel-like products precipitated only after some days. Solutions with less than stoichiometric amounts of water can be stored unchanged for weeks.

*Example 2*

As described in Example 1, 2 mol each of bromomethyldimethyl-chlorosilane and methyl-triethoxy-silane were cohydrolyzed, and the reaction product (580 g.; $n_D^{20}=1.4230$) was reacted with 4 mol of di-(aminoethyl)-amine. There were obtained 480 g. of a yellowish oil, $n_D^{20}=1.4573$, with the following analytical data:

42.06% C; 10.08% H; 16.19% N and 17.3% Si

For the

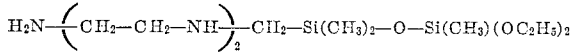

preponderately present:

44.53% C; 10.28% H; 13.00% N and 17.36% Si were calculated.

Example 3

As described in Example 1, 2 mol each of bromomethyldimethyl-chlorosilane and tetraethoxy-silane were co-hydrolyzed, and the reaction product (580 g., $n_D^{20}=1.4260$) was reacted with 4 mol of ethylene-diamine. The conversion was 82%, referred to the titratable bromide. There resulted a yellowish oil in a yield of 435 g., $n_D^{20}=1.4313$, with the following analytical data:

39.79% C; 8.78% H; 6.61% N and 20.7% Si

Example 4

As described in Example 1, 2 mol each of bromomethyl-dimethyl-chlorosilane and methyl-triethoxy-silane were co-hydrolyzed and then reacted with 4 mol of ethylene-diamine. There resulted 325 g. of a yellowish oil, $n_D^{20}=1.4347$, with the following data:

35.90% C; 8.0% H; 7.71% N and 24.5% Si

Example 5

As described in Example 1, 2 mol each of bromomethyl-dimethyl-chlorosilane and tetraethoxy-silane were co-hydrolized and reacted with 4 mol of N-(β-hydroxyethyl)-ethylene-diamine. The conversion was 82%, referred to the titratable bromide.

There resulted a gel-like, yellowish product in a yield of 305 g. with the following analytical data:

36.27% C; 7.50% H; 7.56% N

Example 6

As described in Example 1, 2 mol each of bromomethyl-dimethyl-chlorosilane and methyl-triethoxy-silane were co-hydrolyzed and reacted with 4 mol of N-(β-hydroxyethyl)-ethylene-diamine. There resulted a gel-like product in a yield of 350 g. with the following analytical data:

36.59% C; 8.59% H and 7.41% N

Example 7

As described in Example 1, the co-hydrolysate of 4 mol each of bromomethyl-dimethyl-chlorosilane and tetraethoxy-silane was reacted with 8 mol of allylamine. Conversion according to bromide titration 88%. There resulted a yellowish oil in a yield of 870 g., $n_D^{20}=1.4260$, with the following analytical data:

42.45% C; 4.0% N

Example 8

A solution of 132 g. (0.65 mol) of bromomethyldimethyl-ethoxy-silane, 49 g. (0.65 mol) of N-(β-hydroxyethyl)-methylamine and 72 g. (0.71 mol) triethylamine in 400 cc. of benzene is heated to boiling under reflux for 7 hours and, after cooling, filtered off with suction from the precipitated triethyl ammonium bromide; the titration of the aqueous salt solution gives 98% of theory of bromide. Benzene is distilled off from the filtrate and the residue fractionated at 47 mm. Hg; at 63° C., 58.5 g. of 2,2,4-trimethyl-2-sila-morpholine distil over ($n_D^{20}=1.4349$).

Example 9

To an ice-cooled solution of 39.7 g. (0.65 mol) of β-hydroxyethylamine and 143.5 g. (1.42 mol) of triethylamine in 1 litre of benzene, there are added dropwise during 5 hours, with stirring, 122 g. (0.65 mol) of bromomethyl-dimethyl-chlorosilane and the temperature subsequently increased to reflux during 4 hours. The mixture is allowed to cool, and the precipitated triethyl ammonium halide filtered off with suction from the mixture; the titration of the total amount of salt gives 97% of theory of halide. The filtrate is fractionated at atmospheric pressure; after distilling off the benzene, there distill over, in a yield of 30% of theory, at 155° C. 2,2-dimethyl-2-sila-morpholine ($n_D^{20}=1.4476$) which also contains 15 percent by weight of the above morpholine from a side reaction.

$C_5H_{13}NOSi$: Calc.—Percent C, 45.73; percent H, 9.97. Found—Percent C, 46.2; percent H, 10.1.

Example 10

To an ice-cooled solution of 86 g. (1 mol) of N,N'-dimethyl-ethylene-diamine and 222 g. (2.2 mols) of triethylamine in 1 litre of benzene, there are added dropwise, with stirring, during 6 hours, 187 g. (1 mol) of bromomethyl-dimethyl-chlorosilane, and, after 24 hours at room temperature, the reaction mixture is heated to boiling under reflux for 6 hours. The precipitated triethyl ammonium halide is subsequently filtered off with suction from the mixture, which is taken up with water and the halide titrated: Cl=99.5% of theory; Br=99.8% of theory. Benzene is distilled off from the filtrate and the residue fractionated at 53 mm. Hg; 28 g. of 1,2,2,4-tetramethyl-2-sila-piperazine of $n_D^{20}=1.4508$ distil over at 64° C.

$C_7H_{18}N_2Si$: Calc.—Percent C, 53.11; percent H, 11.46. Found—Percent C, 52.88; percent H, 11.52.

Example 11

Into 188 g. (1 mol) of bromomethyl-dimethyl-chlorosilane, diluted with 600 cc. of anhydrous benzene, dry ammonia at a temperature of 0° C. was introduced. The precipitated salt was filtered off with suction and well washed with benzene. By dissolving in water and titration, the conversion was 92%, referred to chloride, and 10%, referred to bromide.

The filtrate was evaporated with evacuation, whereby further small amounts of salts precipitated. According to analysis they proved to be the hydrobromide of 2,2,6,6-tetramethyl-2,6-disila-piperazine, melting point with decomposition 270° C.; found 31.10–31.25% Br and 10.93–11.23% N; calculated for $C_6H_{19}N_2Si_2Br$: 31.2% Br and 10.97% N. From the filtrate there were isolated, by fractional distillation through a column, 128 g. (about 80% of theory) of 1,3-di-(bromomethyl)-1,1,3,3-tetramethyl-disilazane, B.P. 68–70° C./0.5 mm. Hg; $n_D^{20}=1.5012$, density=1.4124.

Found: 22.47/22.74% C; 5.49/5.57% H; 4.69/4.78% N; 49.5% Br; molecular weight: 315/321

Calc. for $C_6H_{17}NSi_2Br_2$: MW=319.2
22.59% C; 5.37% H; 4.39% N; 50.09% Br

Ammonia gas was introduced at reflux temperature for 18 hours into 160 g. of the 1,3-di-(bromomethyl)-1,1,3,3-tetramethyl-disilazane produced as above and diluted with 300 cc. of toluene. By filtering off with suction, washing with benzene and ether and drying with evacuation, there were obtained 159 g. (about 90% of theory) of the equimolar mixed salt of ammonium bromide and 2,2,6,6-tetramethyl-2,6-disila-piperazinium bromide.

$C_6H_{18}N_2Si_2 \cdot NBr \cdot NH_4Br$: Calc.—Percent C, 20.1; percent N, 11.6; percent Br, 45.0. Found—Percent C, 20.4; percent N, 11.9; percent Br, 45.3.

Example 12

207 g. (2 mols) of di-(β-aminoethyl)-amine in 200 cc. of toluene were mixed dropwise at room temperature with a solution in 200 cc. of toluene of the 1,3-di-(bromomethyl - 1,1,3,3 - tetramethyl - disilazane (160 g. 0.5 mol) produced according to Example 11. After heating for two hours at 50° C., it was filtered; conversion according to bromide titration 96.5%. The filtrate was evaporated and the excess of amine distilled off (53 g. about 0.5 mol). The residue was heated for 2 hours at 150° C. with evacuation by means of an oil pump, whereby ammonia was split off. There resulted a yellow, very viscous product in a yield of 100 g. with the following analytical data: 48.9% C; 16.9 N.

For polymers of the structural unit:

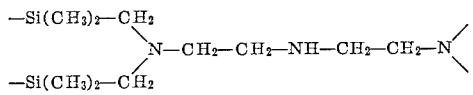

49.32% C and 17.26% N are calculated.

Example 13

To a mixture of 90 g. (1.5 mols) of ethylene diamine and 200 cc. of benzene, there were added dropwise, 160 g. (0.5 mol) of the 1,3 - di - (bromomethyl) - 1,1,3,3-tetramethyl - disilazane produced according to Example 11 and diluted with 100 cc. of benzene. After boiling for two hours, it was filtered and, by dissolving the salt phase in water and titration, a conversion of 94%, referred to Br⁻, was found. By working up the filtrate as in Example 12, 82 g. of a viscous yellowish oil, $n_D^{20}$=1.4932, were isolated with the following analytical data: 46.24–46.40% C; 14.68–14.69% N.

For polymers of the structural unit:

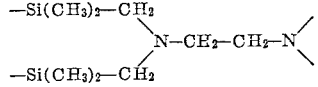

48.0% C and 14.0% N are calculated.

Example 14

160 g. (0.5 mol) of 1,3 - di - (bromomethyl) - 1,1,3,3-tetramethyl-disilazane in 100 cc. of absolute ether were mixed dropwise with 90 g. (1.5 mol) of propylamine in 300 cc. of ether. The mixture was then stirred for 8 hours at room temperature. After filtering off, dissolving in water and titration, a conversion of 70%, referred to bromide, was found. From the filtrate there were isolated by by fractional distillation through a column, 60 g. of 4 - propyl - 2,2,6,6 - tetramethyl - 2,6 - disila-piperazine, B.P. 80–82° C./11 mm. Hg, $n_D^{20}$=1.4505, with the following analytical data:

Molecular weight 222/220;

The compound $C_9H_{24}N_2Si_2$ requires M.W.=216.5
Calc.—Percent C, 49.7; percent N, 12.8. Found— Percent C, 49.9; percent N, 13.0.

Example 15

160 g. (0.5 mol) of 1,3 - di - (bromomethyl) - 1,1,3,3-tetramethyl-disilazane in 100 cc. of benzene were mixed at room temperature with 85 g. of allylamine (1.5 mols) diluted with 300 cc. of benzene. The mixture was stirred for 2 days without heat supply. By filtering off, dissolving in water and titration, a conversion of 74%, referred to titratable bromine, was found.

From the filtrate there were isolated 63 g. of 4-allyl-2,2,6,6-tetramethyl-2,6-disila-piperazine, B.P. 91–93° C./12 mm. Hg, $n_D^{20}$=1.4672, with the following analytical data:

Molecular weight 216/221; 50.22/50.52% C.
The compound $C_9H_{22}N_2Si_2$ required M.W.=214.5; 50.40% C.

Example 16

2 mol (375 g.) of bromomethyl-dimethyl-chlorosilane were added dropwise to 500 cc. of liquid methylamine at about −20° C. After a few hours, the clear solution was warmed to room temperature and stirred with 300 cc. of absolute ether for two hours under reflux boiling. It was then filtered and washed with ether. The salts filtered off with suction consisted of a mixture of methyl ammonium chloride and bromide; the titration gave a conversion of almost 100%, referred to Cl⁻, and of 74%, referred to Br⁻.

The filtrate was evaporated and the partially solidified residue boiled for 8 hours with 200 cc. of triethylamine and 300 cc. of benzene. After suction filtration of the triethyl ammonium bromide (100 g.) and fractional distillation through a column, there were isolated 135 g. (about 67% of theory) of 1,2,2,4,6,6-hexamethyl-2,6-disila-piperazine, B.P. 65–66° C./12 mm. Hg, $n_D^{20}$=1.4516, density=0.8687, with the following analytical data:

47.30/47.38% C; 10.96/10.97% H; 13.92/13.93% N
The compound $C_8H_{22}N_2Si_2$ requires 47.46% C; 10.95% H and 13.84% N

Example 17

Methylamine gas was introduced with stirring, at 0° C. into a solution of 1 mol of bromomethyl-dimethyl-chlorosilane in 600 cc. of benzene. By suction filtration, washing with benzene and drying at the oil pump, there were isolated 132 g. of a mixture of methyl ammonium chloride and bromide. The titration gave a conversion of 100%, referred to Cl⁻, and of 55%, referred to Br⁻. The filtrate was evaporated with evacuation by means of a water jet pump, whereby further salts precipitated; the whole solution finally solidified to a large extent. By suction filtration, washing with benzene and ether, and drying at the oil pump, there were isolated 101 g. (about 71% of theory) of 1,2,2,4,6,6-hexamethyl-2,6-disila-piperazine hydrobromide, melting point with decomposition 240° C., with the following analytical data:

33.34/33.48% C; 8.15/8.23% H; 9.49/9.76% N; 26.95% Br

The compound $C_8H_{23}N_2Si_2Br$ requires 33.90% C; 8.18% H; 9.89% N and 28.2% Br.

Example 18

1 mol of bromomethyl-dimethyl-chlorosilane, diluted with 200 cc. of benzene, was added dropwise to 275 g. (4.8 mol) of allylamine in 400 cc. of benzene. After boiling for two hours, the lower phase was separated, dissolved in water, and a conversion of about 90% was found by halide titration. The upper phase was again boiled for 2 hours with 1 mol of allylamine; after filtration and distillation, there could be isolated 60 g. of N,N′-diallyl-2,2,6,6-tetramethyl-2,6-disila-piperazine, B.P.=93–96° C./4 mm. Hg, $n_D^{20}$=1.4718, with the following analytical data:

56.31/56.23% C; 11.30/11.60% N; 21.2% Si
The compound $C_{12}H_{16}N_2Si_2$ requires 56.63% C; 11.01% N and 22.06% Si

Example 19

4 mol of ethylene diamine in 200 cc. of benzene were slowly added to a mixture of 1 mol of bromomethyl-dimethyl-chlorosilane and 200 cc. of benzene. It was boiled for 4 hours, the lower phase then separated and a conversion of 97% found by halide titration.

The benzene phase was evaporated and the residue heated at 120° C. and 30 mm. Hg. There were isolated 66 g. of a viscous, yellow oil, $n_D^{20}$=1.4898, with the following analytical data:

46.89/47.04% C; 17.64/17.76% N and 22.8% Si

Example 20

Dry ammonia gas was introduced into an ice-cooled solution of 208 g. (2 mol) of methyl-bromomethyl-dichlorosilane in 600 cc. of benzene. After filtration and evaporation of the solvent with evacuation, there remained a viscous residue which was heated at 50° C. and 1 mm. Hg. There were isolated 62 g. of a viscous, yellowish oil, $n_D^{20}=1.5462$, the greater part of which gradually solidified. The analytical data (found 16.00–16.15 C; 8.48–8.52% N; 48.55% Br; 17.9% Si and molecular weight 484–479) indicate the product of the formula:

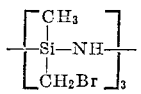

We claim:

1. A sila-piperazine derivative of the formula

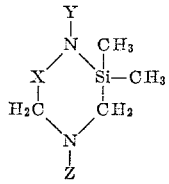

wherein X is a divalent radical selected from the group consisting of methylene and dimethylsilylene, and Y and Z are each selected from the group consisting of hydrogen and aliphatic hydrocarbon radicals of 1–3 carbon atoms.
2. 1,2,2,4-tetramethyl-2-sila-piperazine.
3. 2,2,6,6-tetramethyl-2,6-disila-piperazine.
4. 2,2,6,6-tetramethyl-2,6-disila-piperazinium bromide.
5. 2,2,6,6-tetramethyl-4-propyl-2,6-disila-piperazine.
6. 2,2,6,6-tetramethyl-4-allyl-2,6-disila-piperazine.
7. 1,2,2,4,6,6-hexamethyl-2,6-disila-piperazine.
8. 1,2,2,4,6,6-hexamethyl-2,6-disila-piperazinium bromide.
9. 2,2,6,6-tetramethyl-1,4-diallyl-2,6-disila-piperazine.

References Cited by the Examiner

UNITED STATES PATENTS

| | | | |
|---|---|---|---|
| 2,567,131 | 9/1951 | Speier | 260—448.2 |
| 2,715,133 | 8/1955 | Speier | 260—448.2 |
| 2,738,357 | 3/1956 | Speier | 260—448.2 |
| 2,754,311 | 7/1956 | Elliott | 260—448.2 |
| 3,230,242 | 1/1966 | Fink | 260—448.2 |

FOREIGN PATENTS 1,230,820  4/1960  France.

OTHER REFERENCES

Andrianov et al. I, "Izvest. Akad. Nauk SSSR," 1957, pages 577–84 (51 Chem. Abstracts 15398–9 (1957)).

Andrianov et al. II, ibid, 1959, pages 278–82 (53 Chem. Abstracts 19849 (1959)).

Simmler I, "Berichte der Deutschen Chem. Gesellschaft," vol. 94, June 1, 1961, pages 1585–91.

Simmler II, ibid, vol. 96, January 21, 1963, pages 349–56.

TOBIAS E. LEVOW, *Primary Examiner.*

SAMUEL H. BLECH, *Examiner.*

P. F. SHAVER, *Assistant Examiner.*